United States Patent
Losio

(10) Patent No.: US 8,333,023 B2
(45) Date of Patent: Dec. 18, 2012

(54) COMPOSITE FOOTWEAR INSOLE, AND METHOD OF MANUFACTURING SAME

(75) Inventor: Massimo Losio, Asolo (IT)

(73) Assignee: Technogel Italia S.R.L., Pozzoleone (Vicenza) (IT)

(*) Notice: Subject to any disclaimer, the term of this patent is extended or adjusted under 35 U.S.C. 154(b) by 979 days.

(21) Appl. No.: 10/598,859

(22) PCT Filed: Mar. 15, 2005

(86) PCT No.: PCT/IB2005/000656
§ 371 (c)(1),
(2), (4) Date: May 14, 2009

(87) PCT Pub. No.: WO2005/089580
PCT Pub. Date: Sep. 29, 2005

(65) Prior Publication Data
US 2010/0043252 A1    Feb. 25, 2010

(30) Foreign Application Priority Data
Mar. 15, 2004    (IT) .............................. VI2004A0052

(51) Int. Cl.
*A43B 13/38* (2006.01)
*A43B 7/14* (2006.01)
(52) U.S. Cl. .............. 36/44; 36/43; 12/142 R
(58) Field of Classification Search ......... 36/43, 44, 36/35 R, 37, 28; 12/146 R, 142 R
See application file for complete search history.

(56) References Cited

U.S. PATENT DOCUMENTS

| | | | | |
|---|---|---|---|---|
| 1,434,471 A * | 11/1922 | Altieri | ........................ | 36/178 |
| 2,004,425 A * | 6/1935 | Bain | ........................ | 36/37 |
| 2,083,581 A * | 6/1937 | Silver | ........................ | 36/145 |
| 2,274,205 A * | 2/1942 | Mann | ........................ | 36/43 |
| 2,862,313 A * | 12/1958 | Jones | ........................ | 36/145 |
| 3,724,106 A | 4/1973 | Magidson | | |
| 5,362,834 A | 11/1994 | Schapel et al. | | |
| 6,003,250 A | 12/1999 | Cheong | | |
| 6,338,768 B1 * | 1/2002 | Chi | ........................ | 156/269 |
| 6,532,689 B1 | 3/2003 | Jones, Jr. | | |
| 6,598,319 B2 * | 7/2003 | Hardt | ........................ | 36/28 |
| 6,865,823 B1 | 3/2005 | Vindriis | | |
| 7,152,342 B2 * | 12/2006 | Sommer | ........................ | 36/25 R |
| 7,178,269 B2 * | 2/2007 | Bauerfeind et al. | ........ | 36/30 A |
| 7,210,250 B2 * | 5/2007 | Gallegos | ........................ | 36/44 |
| 7,237,346 B2 * | 7/2007 | Lebo | ........................ | 36/28 |
| 7,464,490 B2 * | 12/2008 | Lebo | ........................ | 36/30 R |
| 2001/0018466 A1 | 8/2001 | Gansen et al. | | |
| 2002/0092203 A1 | 7/2002 | Hardt | | |
| 2004/0221484 A1 * | 11/2004 | Wang | ........................ | 36/29 |

(Continued)

FOREIGN PATENT DOCUMENTS
DE    29905961 U    9/1999
(Continued)

*Primary Examiner* — Marie Patterson
(74) *Attorney, Agent, or Firm* — Tutunjian & Bitetto, P.C.

(57) ABSTRACT

A composite footwear insole has a front portion (2) designed to interact with the foot at the metatarsal region and at least partly at the plantar arch, and a rear portion (3) designed to interact with the heel. The rear portion (3) has at least one layer (4) of gel material whose size is at least substantially equal to that of the rear portion (3) to uniformly support the heel and absorb stresses acting thereon.

18 Claims, 4 Drawing Sheets

U.S. PATENT DOCUMENTS

| | | | |
|---|---|---|---|
| 2005/0144811 A1* | 7/2005 | Harb | 36/117.3 |
| 2006/0026864 A1* | 2/2006 | Arbeiter | 36/29 |
| 2006/0026865 A1* | 2/2006 | Grisoni et al. | 36/43 |
| 2006/0076808 A1* | 4/2006 | Buchel | 297/214 |
| 2006/0265907 A1* | 11/2006 | Sommer | 36/28 |
| 2006/0277799 A1* | 12/2006 | Lebo | 36/102 |
| 2008/0034614 A1* | 2/2008 | Fox et al. | 36/43 |
| 2008/0271340 A1* | 11/2008 | Grisoni et al. | 36/43 |
| 2009/0188131 A1* | 7/2009 | Doerer et al. | 36/88 |
| 2010/0043252 A1* | 2/2010 | Losio | 36/44 |

FOREIGN PATENT DOCUMENTS

| | | |
|---|---|---|
| EP | 1166671 A2 | 5/2001 |

* cited by examiner

COMPOSITE FOOTWEAR INSOLE, AND METHOD OF MANUFACTURING SAME

FIELD OF THE INVENTION

This invention generally finds application in the field of footwear and particularly relates to a composite insole as defined in the preamble of claim 1, and to a method of manufacturing same.

PRIOR ART

The heel is known to be the portion of the foot that is most subjected to shocks and impulsive stresses during walking. For this reason, in many footwear and insole products shock absorbing members are provided at the heel region.

Particularly, EP-A-1166671, WO-A-0024283, WO-A-9831249, US-A-2002092203, U.S. Pat. No. 5,718,063 disclose insoles having a polymeric base material and at least one cavity or opening in which one or more gel inserts are received. Generally, at least one gel insert is placed in a rear portion of the insole at the user's heel to absorb shocks from the ground.

A drawback of such arrangements is that the insert has a small size and causes an uneven distribution of mechanical properties in the rear portion and the insole, thereby affecting comfort for the user. Particularly, transition portions having different stiffness properties are provided between the base material and the gel material. These transition portions may be felt by the wearer and may be particularly uncomfortable as they are placed in the rear portion of the insole, which is subjected to frequent and relatively high stresses.

US-A-2002166259 and FR-A-2808427 disclose respective insoles having a layer of gel material with an upper surface extending substantially all over the plant of the user's foot. A cover layer is further provided, for wholly covering at least the upper surface of the gel layer, in such a manner as to prevent direct contact therewith.

A disadvantage of such arrangements lies in that the cover layer may limit the shock absorbing capacity of the gel layer, thereby affecting the comfort level during walking. Additionally, the arrangement disclosed in US-A-2002166259 provides local portions having different stiffnesses, which can cause inconvenient discontinuities of the pressure felt by the foot and affect the overall comfort.

EP-A-0774219 discloses a footwear insole having a base body made of polymeric foam and a cushion filled with gel positioned on the upper surface of the insole to interact with the user's foot. The insole further has a cavity at the heel portion, which is designed to receive a member for absorption of impulsive stresses on the heel.

A disadvantage of this arrangement consists in that the interaction between the gel cushion and the base body and the interaction between the gel contained in the cushion and the walls thereof may affect the shock absorption and deformation capacities of the gel, thereby reducing the stress absorption effect.

SUMMARY OF THE INVENTION

A primary object of this invention is to obviate the above drawbacks, by providing a composite footwear insole having high comfort properties.

A particular object is to provide an insole which can uniformly distribute stress over the foot and particularly over areas subjected to higher pressure, such as the heel and the metatarsal regions.

A further object of the invention is to provide an insole which has a continuous surface in contact with the foot at the areas subjected to greater stress, which has no discontinuity in stiffness or other mechanical properties.

Yet another particular object is to provide an insole which allows transpiration at the foot areas that are more prone to sweating.

These objects, as well as other objects that will be more apparent hereafter, are fulfilled, according to claim 1, by a composite footwear insole having a front portion for interacting with the foot at the metatarsal region and at least partly at the plantar arch, and a rear portion for interacting with the heel, characterized in that the rear portion has at least one top layer of gel material whose plan size is at least substantially equal to that of the rear portion to uniformly support the heel and absorb stresses acting thereon.

Thanks to this particular arrangement, a particularly comfortable insole may be provided, which can uniformly distribute stresses on the foot and particularly on the heel.

BRIEF DESCRIPTION OF THE DRAWINGS

Further characteristics and advantages of the invention will be more apparent from the detailed description of a few preferred, non-exclusive embodiments of an insole according to the invention, which are described as a non-limiting example with the help of the annexed drawings, in which.

DETAILED DESCRIPTION OF A PREFERRED EMBODIMENT

Figure 1:
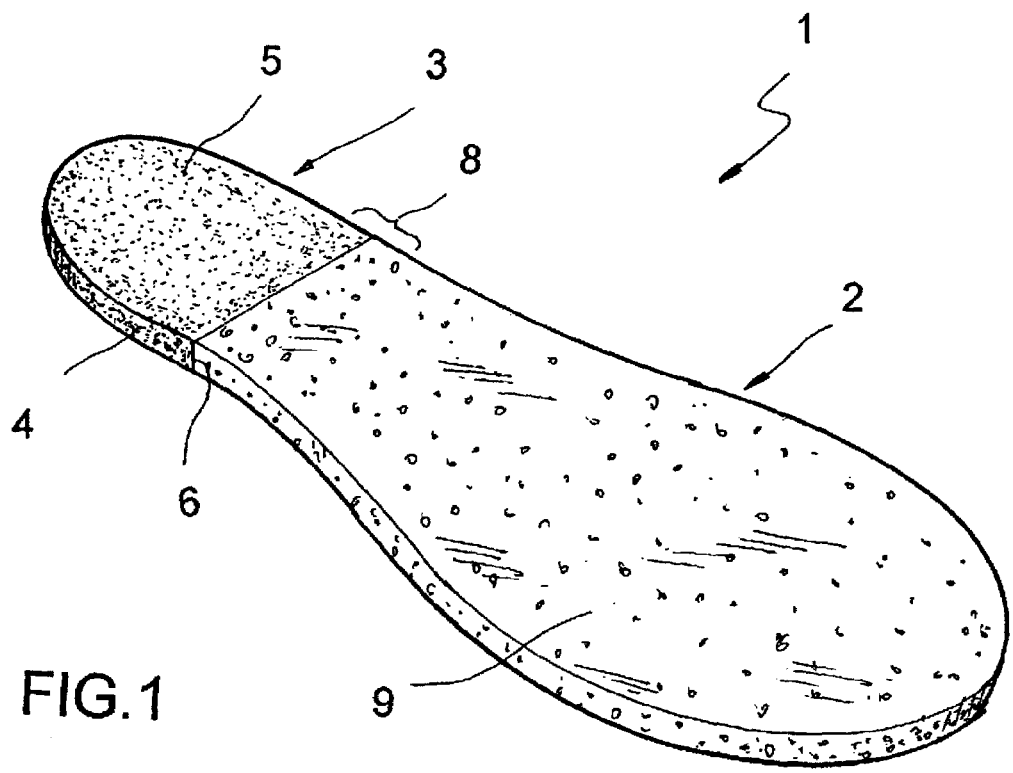
FIG. 1 is a perspective view of a first insole according to the invention.

Particularly referring to the above figures, a composite insole according to the invention, designed for various footwear types, and generally designated by numeral 1, will be described.

The insole 1 has a front portion 2 for interacting with the foot at the metatarsal region and at least partly at the plantar arch, and a rear portion 3 for interacting with the heel.

A peculiar feature of the invention is that the rear portion 3 has a gel layer 4 whose plan size is substantially equal to that of the rear portion 3 itself. Thus, the heel may be evenly supported and stresses thereon may be effectively absorbed.

The gel layer 4 may have an upper surface 5 for interacting with the heel, which is substantially continuous, with no surface discontinuity, to further increase comfort. Furthermore, the gel layer 4 may be made either of one piece, from one gel material, or of multiple superimposed layers of different gel materials. For example, two gel materials having different stiffnesses and/or densities may be used. Gel materials may be of various kinds, and preferably of the polyurethane type.

Figure 3:
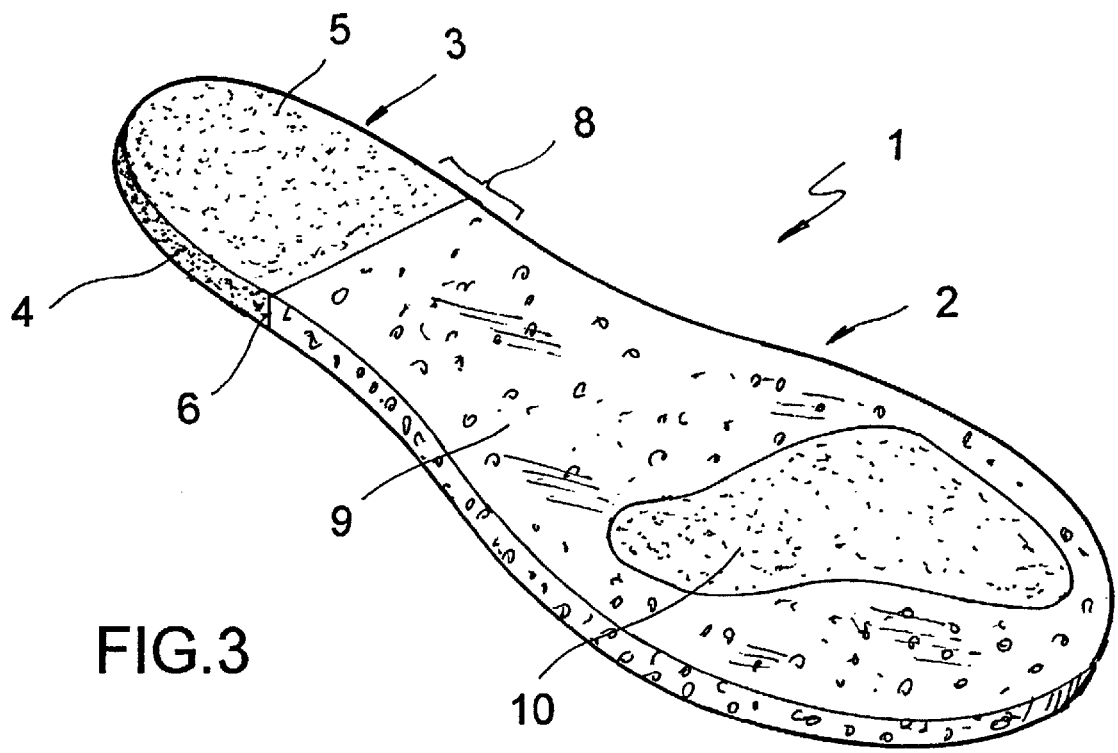
FIG. 3 is a perspective view of a third insole according to the invention.

In certain embodiments, the rear portion 3 may be wholly made of gel material, as shown in FIG. 1 and FIG. 3. In this case, the gel layer 4 extends through the whole thickness of the rear portion 3, which may be connected to the front portion 2 by a continuous junction 6.

Figure 2:
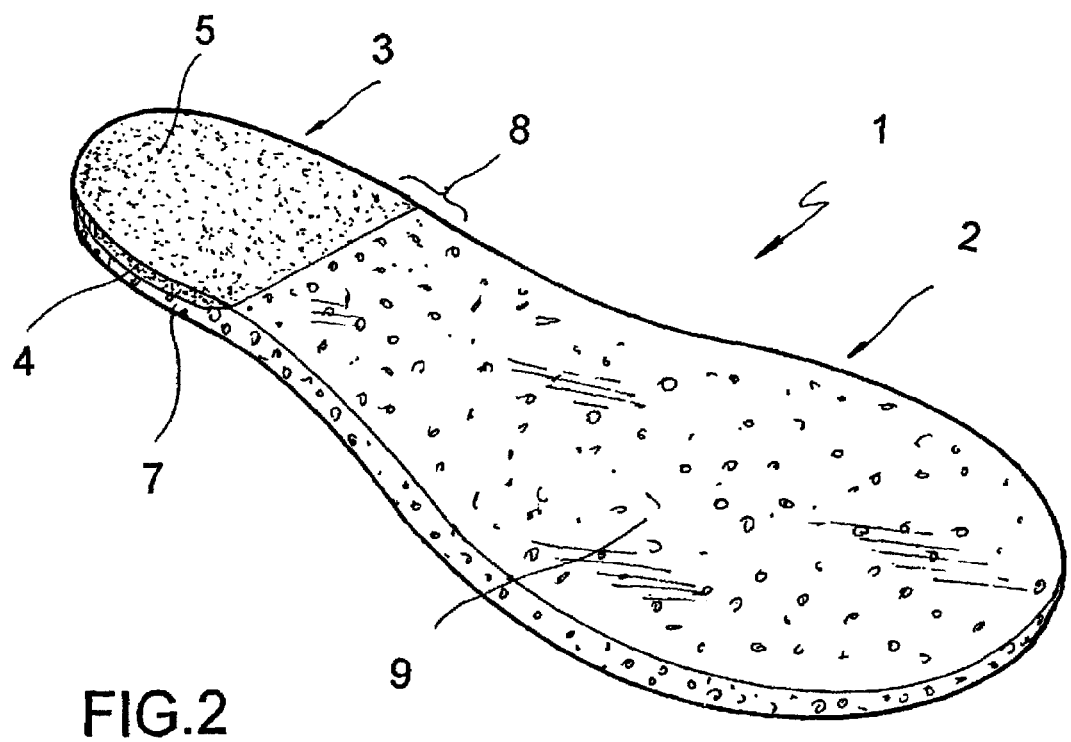
FIG. 2 is a perspective view of a second insole according to the invention.
Figure 4:
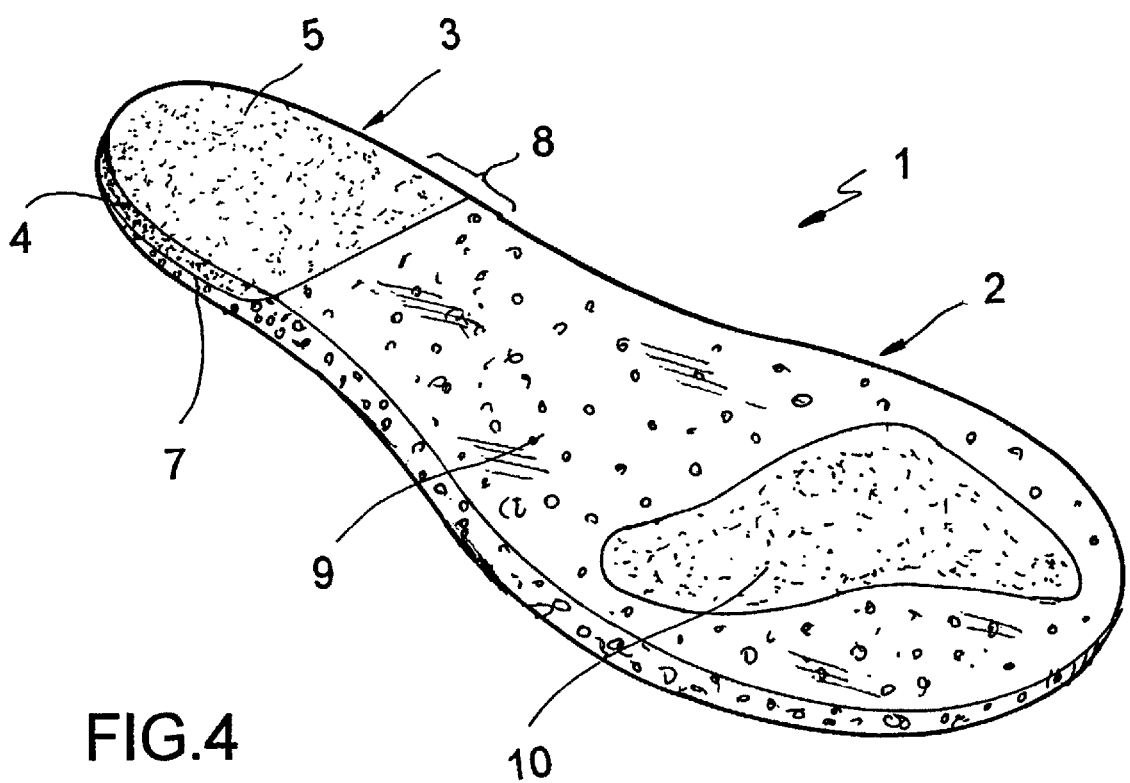
FIG. 4 is a perspective view of a fourth insole according to the invention.

In other embodiments, as shown in FIG. 2 and FIG. 4, the rear portion 3 may comprise a support base 7 made of a semi-rigid, natural or synthetic material, such as a polymeric foam, which lies under the gel layer 4.

Here, the support base 7 may only extend across the rear portion 3 or also across the front portion 2.

Both in case that the gel layer 4 extends through the whole thickness of the rear portion 3, and when a support base 7 is provided under the gel layer 4, the latter may be joined to the front portion 2 by a substantially continuous connecting portion 8, thereby providing a transition between the upper surface 5 of the rear portion 3 and the upper surface 9 of the front portion 2, which is substantially free of discontinuities and inconvenient steps.

The gel layer 4 may be finished at least on the upper surface 5 with a varnish which is capable of reducing tackiness between the rear portion 3 and the heel, to prevent the unpleasant sensation of partial tackiness between the heel and the upper surface 5.

Figure 5:
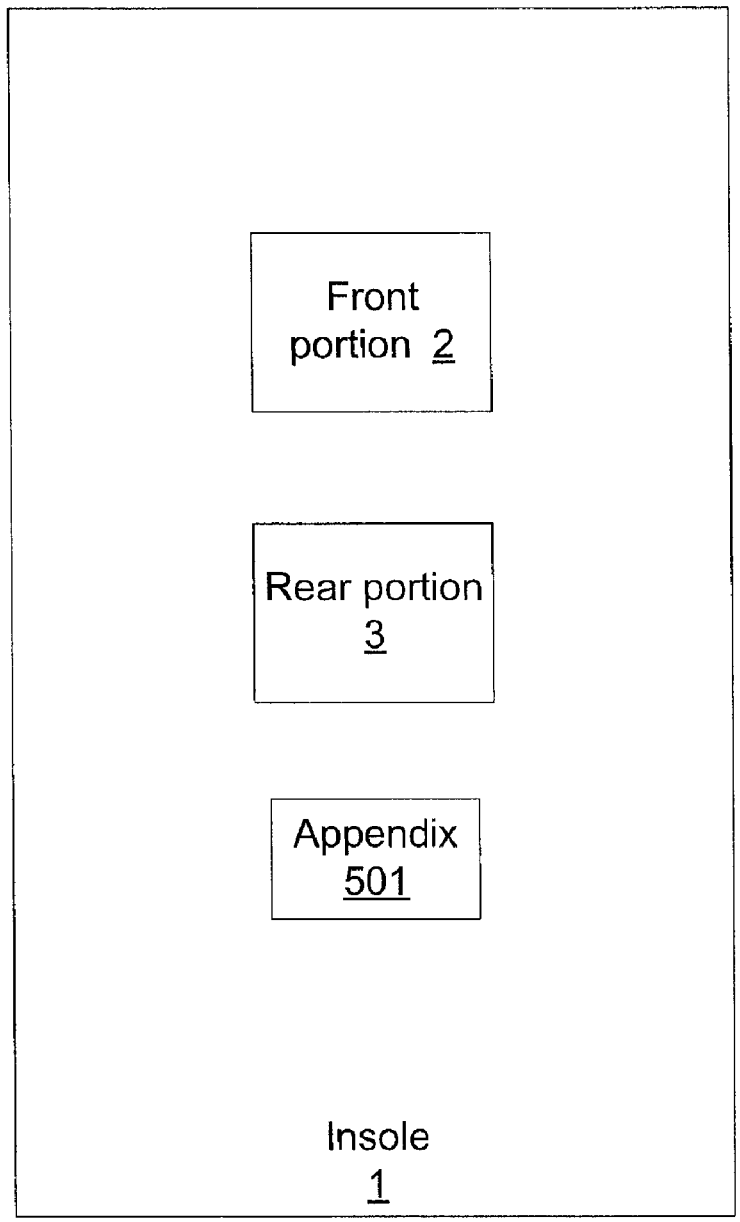
FIG. 5 is a schematic representation of an exemplary insole according to one embodiment.
Figure 6:
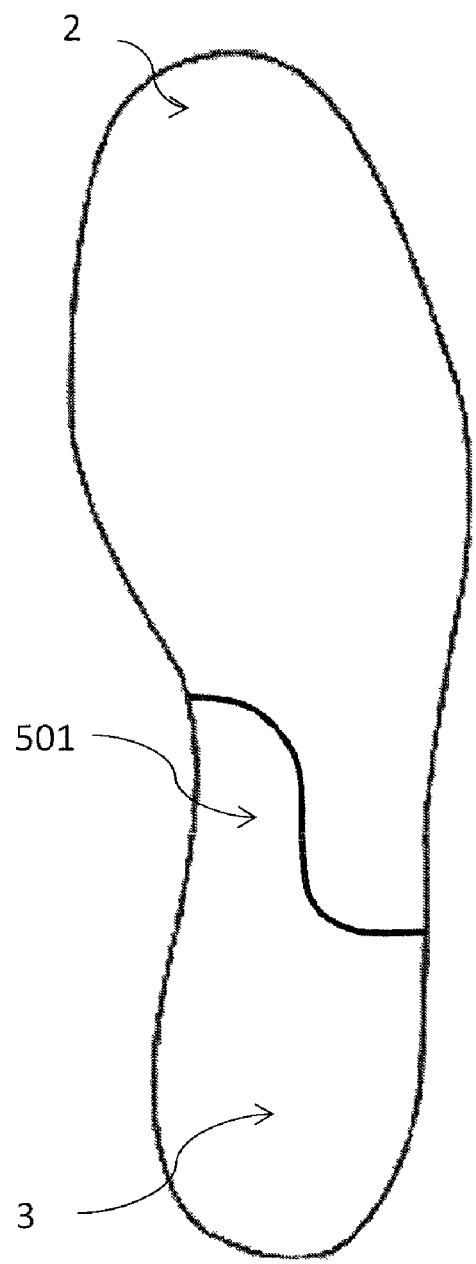
FIG. 6 is a top view of the insole of FIG. 5.

Suitably, the gel layer 4 may have a raised peripheral edge (not shown in the drawings) to substantially conform to the heel anatomy and promote retention thereof during walking. Also, the rear portion 3 may have a one-piece appendix 501, as shown in FIGS. 5 and 6, which extends toward the plantar arch of the foot. Both this one-piece appendix 501 and the raised edge are well-known arrangements to improve the anatomic fit of the insole 1 as well as comfort for the user.

The front portion 2 may comprise at least one layer of transpiring material (not shown in the drawings), which may be selected from the group of leathers, fibers, natural and/or synthetic fabrics. Furthermore, the support base 7 may not only extend at the rear portion 3 but also under the transpiring layer, therefore at the front portion 2.

As shown in the annexed FIG. 3 and FIG. 4, the front portion 2 may comprise an insert 10 of gel material, placed at the metatarsal region, to also absorb shocks between the foot and the ground in this area.

The above insole 1 is fabricated according with a method as described below. Particularly, the method comprises the steps of forming a front portion 2 designed to interact with the foot at the metatarsal region and at least partly at the plantar arch, and forming a rear portion 3, integral with the front portion 2, and designed to interact with the heel. In more detail, the method comprises the step of forming a gel layer 4, by molding it in a special mold (not shown), substantially over the whole plan size of the rear portion 3.

The gel layer 4 may be molded in various manners. According to a first embodiment, the gel layer 4 is co-molded with the front portion 2. Thus, the previously preformed front portion 2 is placed in the mold, and the gel material is introduced thereafter. Therefore, the gel layer 4 forms the whole rear portion 3 and such molding process allows to connect the front portion 2 to the rear portion 2 by a continuous junction 6.

In a second embodiment, the gel layer 4 is co-molded with the front portion and a support base 7 made of a semi-rigid material. Here, the gel material is molded over the support base 7 at the rear portion 3 and permanently bonds both with the support base 7 and the front portion 2.

In a third embodiment, the front portion 2 and the rear portion 3 are fabricated separately and are later joined by a substantially continuous connecting junction. Here, the rear portion 3 may be either only formed by the gel layer 4 or also comprise the support base 7. Further, the front portion 2 may be joined to the rear portion by gluing, stitching or other similar methods.

Once the intermediate assembly composed of the front portion 2 and the rear portion 3 has been fabricated according to one of the above embodiments, the gel layer 4 may be varnished at one upper surface 5 to reduce tackiness to the heel.

Alternatively, before fabricating the rear portion 3 in accordance with any of the above embodiments, the mold may be previously coated with a non-stick varnish, designed to cover an upper surface 5 of the gel layer 4 to reduce its tackiness to the heel.

From the above disclosure, the insole of the invention proves to fulfill the proposed objects and particularly provides a high comfort level, by effectively absorbing shocks caused by foot/ground contact.

The insole of the invention is susceptible of a number of changes and variants, within the inventive concept disclosed in the appended claims. All the details thereof may be replaced by other technically equivalent parts, and the materials may vary depending on different needs, without departure from the scope of the invention.

While the insole has been described with particular reference to the accompanying figures, the numerals referred to in the disclosure and claims are only used for the sake of a better intelligibility of the invention and shall not be intended to limit the claimed scope in any manner.

The invention claimed is:

1. A composite footwear insole comprising a front portion for interacting with the user's foot at the metatarsal region and at least partly at the plantar arch, and a rear portion for interacting with the foot over the heel region, said rear portion having at least one layer of gel material whose plan size is substantially equal to that of said rear portion and being smaller than the plan size of the entire insole to uniformly support the heel and absorb and uniformly distribute stresses acting thereon, said gel material having an upper surface for interacting with the heel, wherein said gel material is made of one piece and is connected to the front portion by a substantially continuous connecting junction that has no discontinuities to further increase comfort, and said upper surface is configured to be in direct contact with the user's heel, wherein said connecting junction is substantially continuous with respect to both an upper and lower surface of the rear portion and the front portion.

2. Insole as claimed in claim 1, wherein said rear portion is wholly made of gel material.

3. Insole as claimed in claim 1, wherein said rear portion comprises a support base made of a semi-rigid, natural or synthetic material, underlying said gel layer.

4. Insole as claimed in claim 1, wherein said gel layer is finished at least on said upper surface with a varnish which is capable of reducing tackiness between said rear portion and the heel.

5. Insole as claimed in claim 1, wherein said gel layer has a raised peripheral edge to conform to the heel anatomy and favor retention thereof.

6. Insole as claimed in claim 1 wherein said front portion comprises at least one layer of transpiring material.

7. Insole as claimed in claim 3, wherein said semi-rigid support base extends across said front portion.

8. Insole as claimed in claim 7, wherein said front portion comprises at least one layer of transpiring material, and said support base extends under said transpiring layer at said front portion.

9. Insole as claimed in claim 1, wherein said rear portion has a one-piece appendage extending toward the plantar arch of the foot.

10. Insole as claimed in claim 1, wherein said front portion comprises a gel insert placed at the metatarsal region.

11. A method of manufacturing a footwear insole comprising the steps of forming a front portion designed to interact with the foot at the metatarsal region and partly at the plantar arch, forming a rear portion, integral with the front portion, and designed to interact with the heel, forming a gel layer, and molding it in a mold, substantially over the whole plan size of said rear portion and less than the plan size of the entire insole, wherein said gel layer is co-molded with said front portion and a semi-rigid support base.

12. Method as claimed in claim 11, the front portion and the rear portion are fabricated separately and are later joined by a substantially continuous connecting junction.

13. Method as claimed in claim 11, wherein said gel layer is coated at an upper surface thereof with a varnish which is capable of reducing its tackiness to the heel.

14. Method as claimed in claim 11, wherein a non-stick varnish is previously applied on said mold for coating are upper surface of the gel layer to reduce its tackiness to the heel.

15. The method of claim 11, wherein said semi-rigid support base is provided under the gel layer and extends across the rear portion.

16. A method of manufacturing a footwear insole comprising the steps of:
   forming a front portion configured to interact with the foot at the metatarsal region and partly at the plantar arch;
   forming a rear portion, integral with the front portion, wherein said rear portion is made of one piece and is configured to interact with the heel; and
   forming a gel layer, and molding it in a mold, substantially over the whole plan size of said
rear portion and less than the plan size of the entire insole, wherein the front portion and the rear portion are fabricated separately and are subsequently joined by a substantially continuous connecting junction.

17. A composite footwear insole comprising a front portion for interacting with the user's foot at the metatarsal region and at least partly at the plantar arch, and a rear portion for interacting with the foot over the heel region, said rear portion having at least one layer of gel material whose plan size is substantially equal to that of said rear portion and being smaller than the plan size of the entire insole to uniformly support the heel and absorb stresses acting thereon, said gel material having an upper surface for interacting with the heel and a lower surface for directly contacting a support base, wherein said gel material is made of one piece and is connected to the front portion by a substantially continuous connecting junction configured to be substantially free of discontinuities, and said upper surface is configured to be in direct contact with the user's heel, wherein said connecting junction is substantially continuous with respect to at least an upper surface of the rear portion and the front portion.

18. The insole of claim 17, wherein the substantially continuous connecting junction comprises a transition which is substantially perpendicular to a longitudinal axis of the insole.

\* \* \* \* \*